United States Patent [19]
Glascock et al.

[11] Patent Number: 6,051,200
[45] Date of Patent: Apr. 18, 2000

[54] PROCESS FOR PREPARING HEMIPOTASSIUM PHOSPHATE

[75] Inventors: Joan K. Glascock, St. Louis; Barbara B. Heidolph, Wentzville; Louis A. Highfill, Washington, all of Mo.

[73] Assignee: Solutia Inc., St. Louis, Mich.

[21] Appl. No.: 09/114,724

[22] Filed: Jul. 13, 1998

Related U.S. Application Data

[63] Continuation of application No. 08/708,254, Sep. 6, 1996, abandoned
[60] Provisional application No. 60/003,479, Sep. 8, 1995.

[51] Int. Cl.[7] .................................................. C01B 25/30
[52] U.S. Cl. ............................................................ 423/309
[58] Field of Search .............................................. 423/309

[56] References Cited

U.S. PATENT DOCUMENTS

| | | | |
|---|---|---|---|
| 2,715,059 | 8/1955 | Miller | 23/106 |
| 2,851,360 | 9/1958 | Diller . | |
| 3,554,729 | 1/1971 | Curless | 423/309 |
| 3,966,994 | 6/1976 | Kennedy . | |
| 5,114,460 | 5/1992 | Nguyen et al. | 71/34 |

FOREIGN PATENT DOCUMENTS

| | | |
|---|---|---|
| 1111216 | 4/1968 | United Kingdom . |
| 1252781 | 11/1971 | United Kingdom . |

OTHER PUBLICATIONS

A. Chretien et al., "Nouveau Traite de Chime Mineral Paul Pascal" (Vol. II) (Masson & Co. 1963) pp. 504 and 533.
"Gmelins Handbuch der Anorganischen Chemie" Kalium Lieferung 5(1938) p. 1002.

*Primary Examiner*—Wayne Langel
*Attorney, Agent, or Firm*—Thompson Coburn LLP; Gordon F. Sieckmann

[57] ABSTRACT

There is disclosed a novel process for preparing hemipotassium phosphate useful as an acidulant for beverages. An equimolar mixture of monopotassium phosphate and phosphoric acid is heated to a temperature above 100° C. cooled with vigorous agitation whereby the liquid loses its free water and crystallizes to a relatively dry crystalline mass. When prepared by the process of this invention hemipotassium phosphate provides a dry, flowable, crystalline product which can be transported and handled easily.

14 Claims, 1 Drawing Sheet

PROCESS FOR PREPARING HEMIPOTASSIUM PHOSPHATE

This application is a continuation of application Ser. No. 08/708,254 filed Sep. 6, 1996, abandoned, which has priority based under 35 U.S.C. § 119(e) of U.S. Provisional Appllication No.: 60/003,479, filed Sep. 8, 1995.

BACKGROUND OF THE INVENTION

FIELD OF THE INVENTION

This invention relates to a process for preparing a relatively dry crystalline product generally known as hemipotassium phosphate and to its utility as a acidulant generally useful in beverage formulations, both dry and liquid forms.

Orthophosphates have been known as ingredients in beverages for various purposes. Potassium levels have been found to be depleted in the body along with other salts and minerals through physical activity and beverages have been designed to replenish body fluids, ions, electrolytes and minerals lost thereby. A typical beverage mix to replenish as well as diminish loss of such elements by dehydration is disclosed in British Patent 1,252,781 to Bradley et al. In the beverage mixes mono- and dibasic potassium phosphates are employed in a dry mix which, when combined with water and other elements provide relief from water loss and its concomitant imbalance of salts and minerals in the body.

Generally phosphoric acid is employed as an acidulant and/or flavoring additive in flavored beverages such as colas, root beers, etc. However, phosphoric acid is generally available in liquid form only. One attempt to apply dry beverage mixes in which phosphoric acid is employed is found in U.S. Pat. No. 3,966,994 to Kennedy. This patent discloses a liquid beverage mix in which phosphoric acid is employed as an acidulant. Monoalkali orthophosphates are added to the liquid concentrate in at least equimolar amounts with respect to the phosphoric acid acidulant in the concentrate before drying. Both sodium and potassium orthophosphates are disclosed. According to Kennedy, it is unclear as to the final composition of the dried mix with respect to the form of phosphate acidulant in the dry mix. Kennedy expresses some degree of doubt as to the exact form of the phosphates employed in his dry mix, distinguishing it from the disclosure of U.S. Pat. No. 2,851,360 to Diller wherein partial replacement of the common acidulant, citric acid, by hemisodium phosphate is said to have advantages over the use of citric acid alone. However in Diller's U.S. Pat. No. 3,851,359 there is disclosure indicating that a complex is formed which is different than the hemiphosphate which may be expected from the combination of equimolar addition of mono potassium orthophosphate to phosphoric acid.

A large amount of potassium phosphate is employed in the fertilizer industry. Since both potassium and phosphorus are plant nutrients their combination into one compound provides an ideal product for such use. There is described in U.S. Pat. No. 5,112,460 a process for preparing alkali metal phosphates, including potassium and sodium alkali metals, by ion exchange of potassium chloride, hydrogen chloride and phosphoric acid. An air stream is employed to remove hydrogen chloride gas at temperatures below 200° C. followed by steam stripping to produce an alkali metal orthophosphate.

Many beverage products contain an acidulant to compliment other flavorings or to either highlight or suppress other aroma components. Acidulants are added to beverages, especially nonalcoholic soft drinks and fruit products. Orthophosphoric acid and citric acid are widely used as well as other organic acids such as acetic acid, adipic acid, tartaric acid, lactic acid, malic acid, succinic acid and fumaric acid.

There is no commercial source of a dry, nonhygroscopic, inorganic acidulant for use in beverages, particularly dry mixes, which would effectively replace organic acids. A dry source of phosphoric acid acidulant would enable more convenient formulating as well as shipping, storage and handling of the most popular inorganic acidulant.

SUMMARY OF THE INVENTION

In accordance with this invention there is provided a simple, rapid process for preparing hemipotassium phosphate wherein mono potassium orthophosphate is combined with phosphoric acid in equal molar amounts and heated to a temperature above 100° C. The hot mixture is then placed in a vessel and agitated vigorously whereby the free water is removed as the mixture crystallizes. Potassium hemiphosphate crystallizes driving off any free water to produce a granular, free flowing, fast dissolving, dry material having less than about 0.3% free water. Hemipotassium phosphate in the form produced by the process of this invention is highly useful in the preparation of dry and liquid beverage formulations.

DETAILED DESCRIPTION OF THE INVENTION

Figure 1:
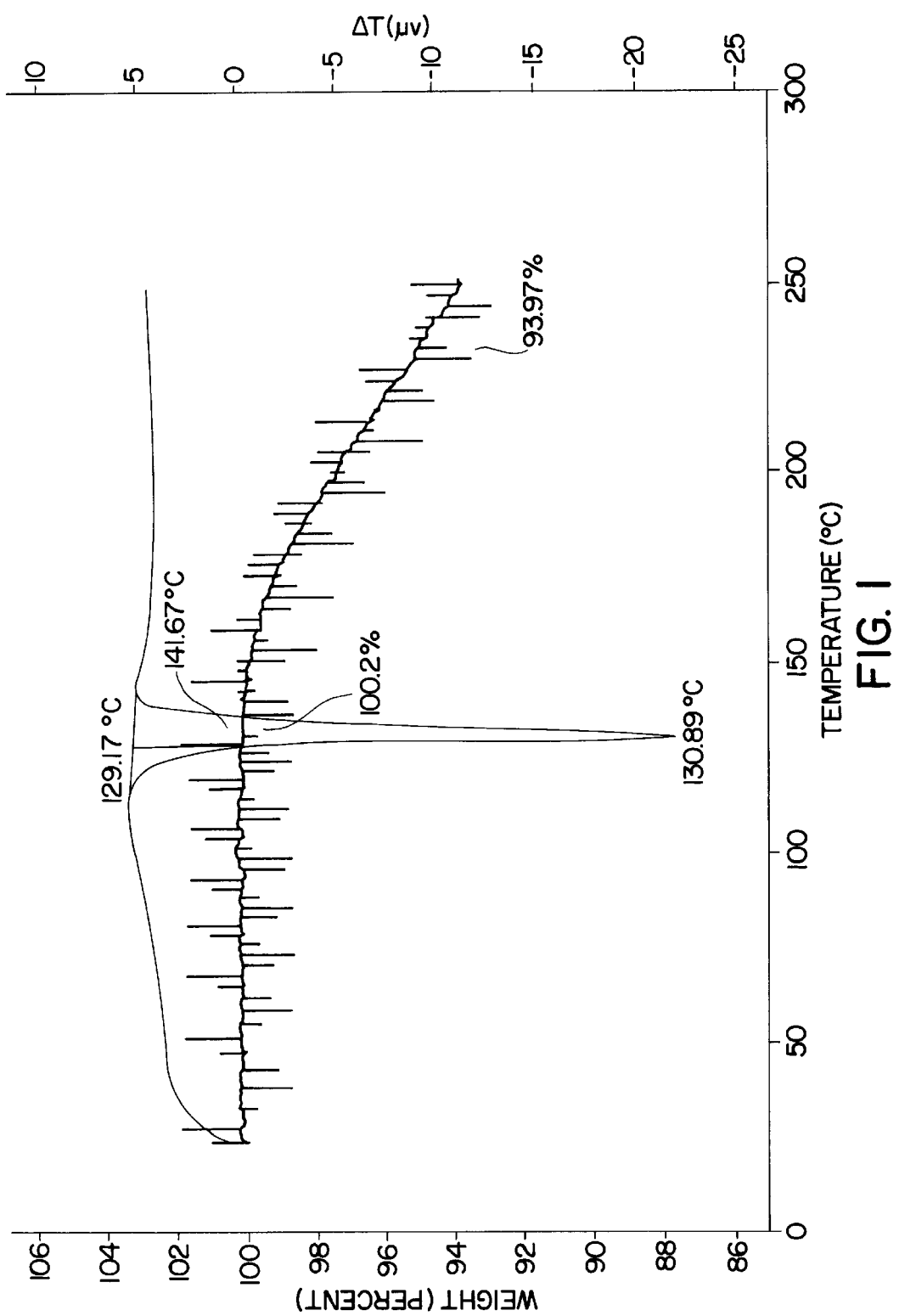
FIG. 1 is a graphical representation of the data obtained from a simultaneous analysis of the hemipotassium phosphate of this invention by means of differential thermal analysis and thermal gravimetric analysis.

In accordance with this invention a source of potassium ion such as mono potassium phosphate is combined with phosphoric acid to produce potassium hemiphosphate. The reaction may be represented as follows:

$$KH_2PO_4 + H_3PO_4 \rightarrow KH_5(PO_4)_2$$

The hemiphosphate can be initially prepared by combining a potassium source other than the orthophosphate salt such as the hydroxide or other suitable potassium base. The convenience in providing the potassium by means of the orthophosphate salt is the reduction in the amount of free water introduced into the mixture. It has been found that the most efficient process employs the least amount of free water. There is usually free water present in the initial mixture from the phosphoric acid, which is typically only 85%, the remaining weight being water.

The hemiphosphate is heated by any typical means such as a jacketed vessel or oven to a temperature in the range of from about 100° C. to about 195° C. Higher temperatures may be employed, however, the hemiphosphate becomes highly corrosive at higher temperatures making the process expensive and cumbersome. Usually, the initial mixture typically of mono potassium orthophosphate and phosphoric acid is heated to a temperature in the range of from about 105° C. to about 120° C. The mixture is usually heated for a period of from 1.5 to about 2 hours. After undergoing the heating step, the hemiphosphate still contains free water and is relatively fluid.

The hot liquid is then placed into a suitable mixing device which is capable of providing vigorous agitation and also preferably containing cooling means. As the liquid cools, crystals of potassium hemiphosphate form, first at the sides of the vessel and then throughout the mixture. Continued agitation and cooling provides an increasingly viscous slurry of crystals and with continuous, vigorous stirring the entire contents of the vessel becomes crystalline, driving off substantially all of the free water. As the contents of the mixing vessel cools to a range of from about 25° C. to about 40° C. the material becomes a free flowing powder. Immediately after cooling and crystallization, the powder can be placed in containers and shipped as substantially dry powder. It has been found that the process of this invention provides crystallized hemipotassium phosphate having less than 0.3% free water, by weight. Surprisingly, the free water contained in the initial mixture, after heating, is removed at ambient room conditions (25° C., standard pressure) during the crystallization step without special devices or removal steps. Thus, although the crystallized potassium hemiphosphate is found to contain very little free water, no special devices or process steps are required to achieve this result.

The potassium hemiphosphate of this invention has been found to be somewhat hygroscopic at higher temperatures during extended exposure to humid air. For example, after 24 hours of exposure at 30° C. and 74.9% relative humidity, weight gain was in the range of from 2.5% to 2.8% while exposure extending for 70 hours provided a weight gain of from 10.6% to 11.6%.

A unique product is provided by the process of this invention whereby dry beverage mixes are easily assembled with a dry, inorganic acidulant. In this utility, a flavor concentrate, commonly called the flavor base, is the beverage component containing all flavorings, sweetener, colors, etc. In this context, sweetener includes not only sugar but also other materials useful for the same purpose such as fructose, inverted sugar, blends of dextrose and sucrose, lactose, maltose and artificial sweeteners such as aspartame. Such flavor bases are widely known and their many descriptions and formulations can be found in published works on the subject which are well known to those of ordinary skill in the beverage art. Typical examples of publications include M. B. Jacobs, "Manufacture and Analysis of Carbonated Beverages, Chemical Publishing Company (1959) and "Food Flavorings" by Merory, The Avi Publishing Company (1960). The dry mix including the flavor base and the hemipotassium phosphate acidulant of this invention may contain typically less than about 3% moisture and in some instances as little as 0.1% moisture. Flavor bases containing any number of flavors such as fruit, root beer or cola flavor can be prepared in accordance with this invention by combining the dry, crystalline hemipotassium phosphate with the flavor base. The reconstituted beverage, diluted with the proper amount of water, may be carbonated as is known in the art.

In addition to dry mixes the hemipotassium phosphate of this invention can be employed in liquid beverage mixes. Any number of such mixes are known in the art and include liquid flavor bases which are dried, liquid concentrates, liquids to which the dry hemipotassium phosphate can be added as well as liquid concentrates which are frozen. Such liquid beverages may be carbonated or non-carbonated in accordance with this invention. Typical liquid flavor bases are obtained commercially having 50% solvent, usually water or ethanol, with the flavor components typical for a particular flavor dissolved therein. Of course, such flavor base may be dried and the hemipotassium phosphate then added to the mix as at least a portion of the acidulant. Typical drying means include spray driers, fluid bed driers and instantizers.

Among the advantages of the hemipotassium phosphate of this invention are its rapid dissolution rate in water and its unique ability to aid dissolution of other ingredients such as aspartame artificial sweetener. In isotonic and sports beverages the use of hemipotassium phosphate provides not only an acidulant but also simultaneously provides potassium as an electrolyte and enhances flavor. In most beverages the hemipotassium phosphate of this invention provides the opportunity to make available lower sodium content while providing an essential electrolyte. Other properties of the hemipostassium phosphate of this invention include antimicrobial action, color stabilization, metal complexation and buffering. It is known that citric acid, the most widely employed beverage acidulant, is not the optimum acidulant in beverages containing tropical fruit and berry flavors. In such beverages the acidulant is commonly malic acid or fumaric acid. Because of its reduced tartness and clean fresh flavor over citric acid the hemipotassium phosphate of this invention is particularly useful in beverages containing tropical fruit and berry flavors such as raspberry or strawberry. Typical tropical fruit flavors which are enhanced through the use of the hemipotassium phosphate of this invention are pineapple, guava, papaya, banana and mango. In yet another feature of this invention there is now available through the use of hemipotassium phosphate of this invention an acidulant which does not contribute any calories thereby providing a reduced calorie beverage over those employing the traditional organic acidulants. Because of the reduced tartness of the hemipotassium phosphate of this invention as noted above, sweetener levels in beverages may be reduced, including natural as well as artificial sweeteners. Such reduction provides not only an economy but also another opportunity to reduce calorie content of the beverage without sacrifice in quality of the beverage.

As will be shown below, typical beverages in which hemipotassium phosphate is useful are those commonly available such as instant dry mix tea as well as the prepared liquid teas, soft drinks, bottled water, fruit (including tropical fruit) punch and drink concentrates. Hemipotassium phosphate is particularly useful in teas containing fruit flavors for reasons noted above. Hemipotassium phosphate may be employed as either the acidulant or at least a portion of the acidulant together with other acidulants such as citric, malic, tartaric, fumaric, adipic, lactic acetic, succinic and gluconic acids.

The following non-limiting examples illustrate the preparation of compositions useful in the process of this invention. In these examples percent is expressed as percent by weight unless otherwise noted.

DESCRIPTION OF THE PREFERRED EMBODIMENTS

EXAMPLE 1

Into a suitable container were placed 581 g of mono potassium phosphate and 493 g of concentrated phosphoric acid (85%). The mixture was agitated by means of a power mixer for a period of 5–10 minutes resulting in a viscous liquid. The liquid was then placed in an oven heated to a temperature in the range of 190° C. to about 200° C. After heating the liquid in the oven for a time in the range of from 1.5 to 2 hours, the temperature of the liquid reached 120° C. at which temperature it was removed from the oven. The liquid was again subjected to vigorous agitation by means of a power mixer whereupon crystals formed as the liquid cooled by air convection. No external cooling was applied. Crystals continued to form during cooling and when reaching a temperature in the range of from about 25° C. to about 40° C. the material became a free flowing powder.

The powder was analyzed (ASTM D-2761) and found to have the following analysis as percent by weight:

| | |
|---|---|
| Trimetaphosphate | 0.10 |
| Tripolyphosphate | 0.08 |
| Pyrophosphate | 2.20 |
| Potassium Orthophosphate | 97.62 |
| Recovery | 99.21 |
| $P_2O_5$ | 60.67 |

An aqueous solution (1%) of the above described composition indicated a pH of 2.24 and loss on drying at 110° C. was 0.07%.

EXAMPLE 2

The material made according to the procedure of Example 1 was subjected to simultaneous thermal gravimetric analysis and differential thermal analysis. The temperature was ramped from 25° C. to 250° C. at the rate of 5° C./min. An endotherm without loss of weight was found at an extrapolated onset of 129.17° C. indicating that no hydrate was formed by the material with a peak temperature of 130.89°. The graphs produced by the above noted analytical procedure is shown in FIG. 1.

EXAMPLE 3

A typical batch of hemipotassium phosphate was tested to determine particle size by means of a screen analysis. the results of the test are shown in Table I below.

TABLE I

| Screen Size - Microns | Percent Retained | Cumulative % |
|---|---|---|
| 850 | 11.64 | 11.64 |
| 300 | 33.96 | 45.60 |
| 180 | 54.40 | 100 |

The particle size characteristics of a typical sample of hemipotassium phosphate was also analyzed by means of a Coulter LS 130 analyzer. This apparatus employs a laser to provide a particle size distribution. The sample passed through a screen having a 725 micron opening. The mean particle size was found to be 193.3 microns and the median particle size was found to be 176.6 microns. The particle size distribution is shown in Table II below in volume percent.

TABLE II

| Volume % | 10 | 25 | 50 | 75 | 90 |
|---|---|---|---|---|---|
| Particle Size | 319.0 | 243.5 | 176.6 | 128.9 | 96.2 |

EXAMPLE 4

A dry beverage mix was prepared to determine the tartness contributed by the hemipotassium phosphate of this invention. Generally, the amount of hemipotassium phosphate employed to provide a similar level of tartness of citric acid is about 40%, by weight, greater than citric acid. Typical dry beverage mixes, as tested, contained comparable amounts of fructose, tricalcium phosphate, food color and food flavor. Equal amounts of water were provided to reconstitute the beverage in liquid form. In the dry mix employing citric acid 0.4 g of sodium citrate was added. The results of the tests appear in the Table III below wherein Hemi-K is an abbreviation for hemipotassium phosphate

TABLE III

| Flavor | Acid - Grams | Sugar | pH | Titrable Acidity |
|---|---|---|---|---|
| Orange | Citric - 5 | 83.0 | 3.23 | 68.2 |
| " | Hemi-K - 6.5 | 81.9 | 2.7 | 75.0 |
| Strawberry | Cetric - 3 | 85.5 | 3.69 | 37.4 |
| " | Hemi-K - 3.9 | 85.0 | 3.22 | 44.2 |
| Lemon | Citric - 6 | 82.0 | 3.16 | 82.0 |
| " | Hemi-K - 7.8 | 80.6 | 2.57 | 71.1 |
| Cherry* | Citric - 1.8 | — | 2.72 | 53.4 |
| " | Hemi-K - 2.52 | — | 2.53 | 60.6 |

*Prepared from dry flavor

In the above examples, the beverages produced by adding water to the dry mix containing hemipotassium phosphate were somewhat less tart and slightly sweeter than the beverages produced in a similar manner but containing citric acid.

In the Table IV below are listed typical use levels of hemipotassium phosphate in various flavor bases, either dry or liquid. The amount shown and is weight percent in the dry mix as well as in liquid formulations.

TABLE IV

| BEVERAGE TYPE | PERCENTAGE DRY WEIGHT | PERCENTAGE LIQUID FORMULATION |
|---|---|---|
| Fruit Juice Drinks | — | 0.025–9.8 |
| Dry Powder Beverage Mix (No Sweetener) | 10–90 | |
| Isotonic/Sports Drink | 1–7 | 0.01–0.4396 |
| Dry Powder Beverage Mix Sweetened With High Intensity Sweeteners | 10–80 | 0.001–0.01 |
| Instant Breakfast Fruit Drink | 1–7 | |
| Carbonated Dry Powder Beverage | 0.25–2 | 0.05–0.252 |
| Wine | | 0.01–0.1 |
| Bar Mixers | | 0.07–0.42 |
| Dry Powder Beverage Mix Sweetened With Carbohydrate Sweetener | 2–10 | |

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process for producing crystalline hemipotassium phosphate which comprises combining equimolar portions of a potassium ion source and phosphoric acid so as to provide a molar ratio of potassium to phosphorus of 1/2, respectively, heating said combination to a temperature above about 100° C. and then cooling the combination at atmospheric pressure while providing vigorous agitation, expelling free water.

2. The process of claim 1 wherein the combination is heated to a temperature in the range of from about 100° C. to about 195° C.

3. The process of claim 1 wherein the potassium ion source is monopotassium orthophosphate.

4. The process of claim 1 wherein the combination is cooled to a temperature in the range of from about 25° C. to about 45° C.

5. The process of claim 1 wherein the combination is placed in a vessel containing cooling means and is cooled by such means during said agitation.

6. The process of claim 1 wherein the crystallized product contains less than 0.3% free water, by weight.

7. A process for producing crystalline hemipotassium phosphate which comprises combining equimolar portions of monopotassium orthophosphate and phosphoric acid so as to provide a molar ratio of potassium to phosphorus of 1/2, respectively, heating said combination to a temperature above about 100° C. and then cooling the combination while providing vigorous agitation, expelling free water.

8. The process for producing crystalline hemipotassium phosphate which comprises combining equimolar portions of (a) a potassium ion source which is monopotassium orthophosphate or a potassium base and (b) phosphoric acid, so as to provide a molar ratio of potassium to phosphorus of 1/2, respectively, heating said combination to a temperature above about 100° C. and then cooling the combination while providing vigorous agitation, expelling free water.

9. The process of claim 8 wherein the combination is heated to a temperature in the range of from about 100° C. to about 195° C.

10. The process of claim 8 wherein the combination is cooled to a temperature in the range of from about 25° C. to about 45° C.

11. The process of claim 8 wherein the combination is placed in a vessel containing cooling means and is cooled by such means during said agitation.

12. The process of claim 8 wherein the crystallized product contains less than 0.3% free water, by weight.

13. The process of claim 8 wherein said potassium base is potassium hydroxide.

14. A process for producing crystalline hemipotassium phosphate which comprises combining equimolar portions of a potassium ion source, with the proviso that the potassium ion source is not potassium chloride, and phosphoric acid so as to provide a molar ratio of potassium to phosphorus of 1/2, respectively, heating said combination to a temperature above about 100° C. and then cooling the combination while providing vigorous agitation, expelling free water.

* * * * *